United States Patent Office 3,477,096
Patented Nov. 11, 1969

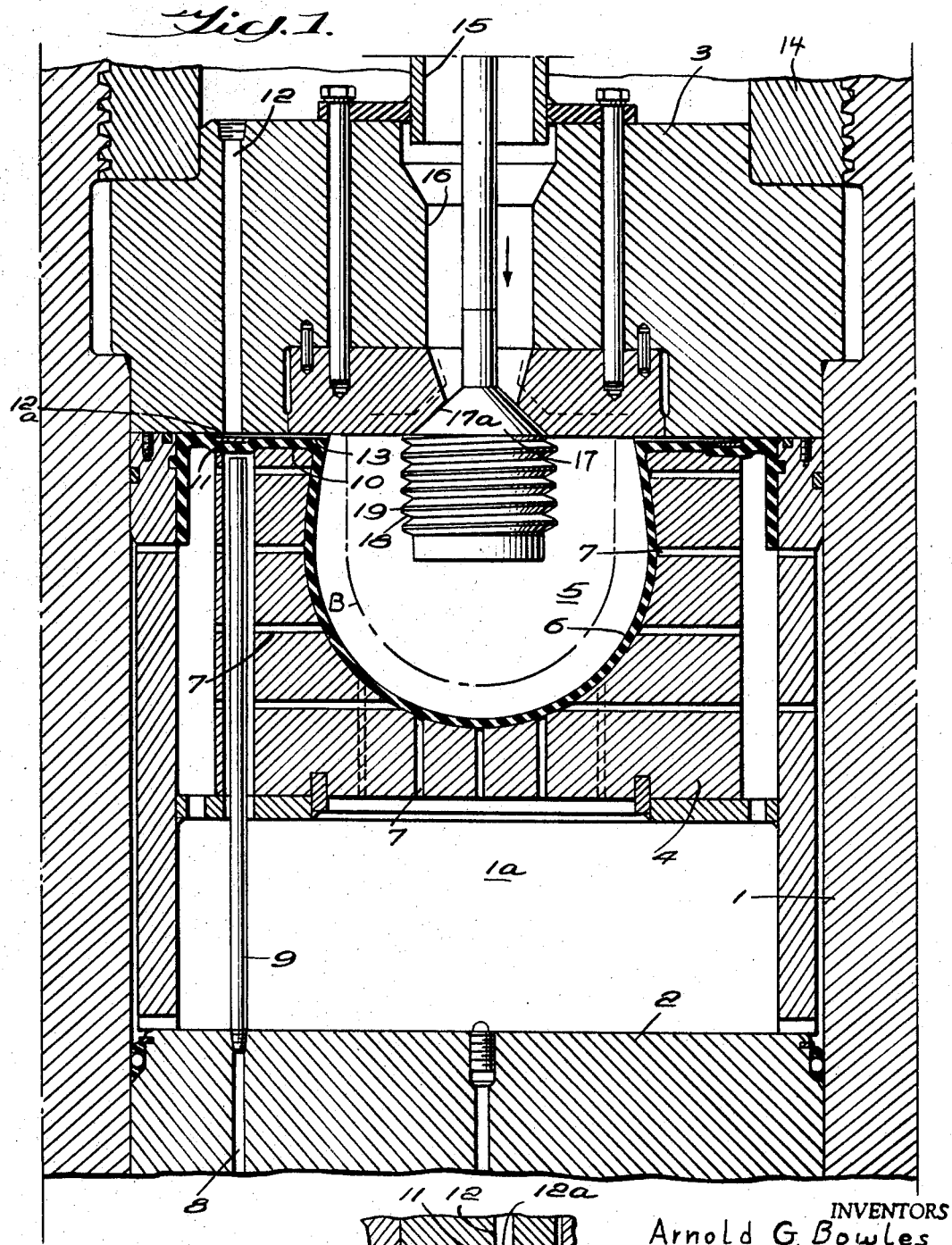

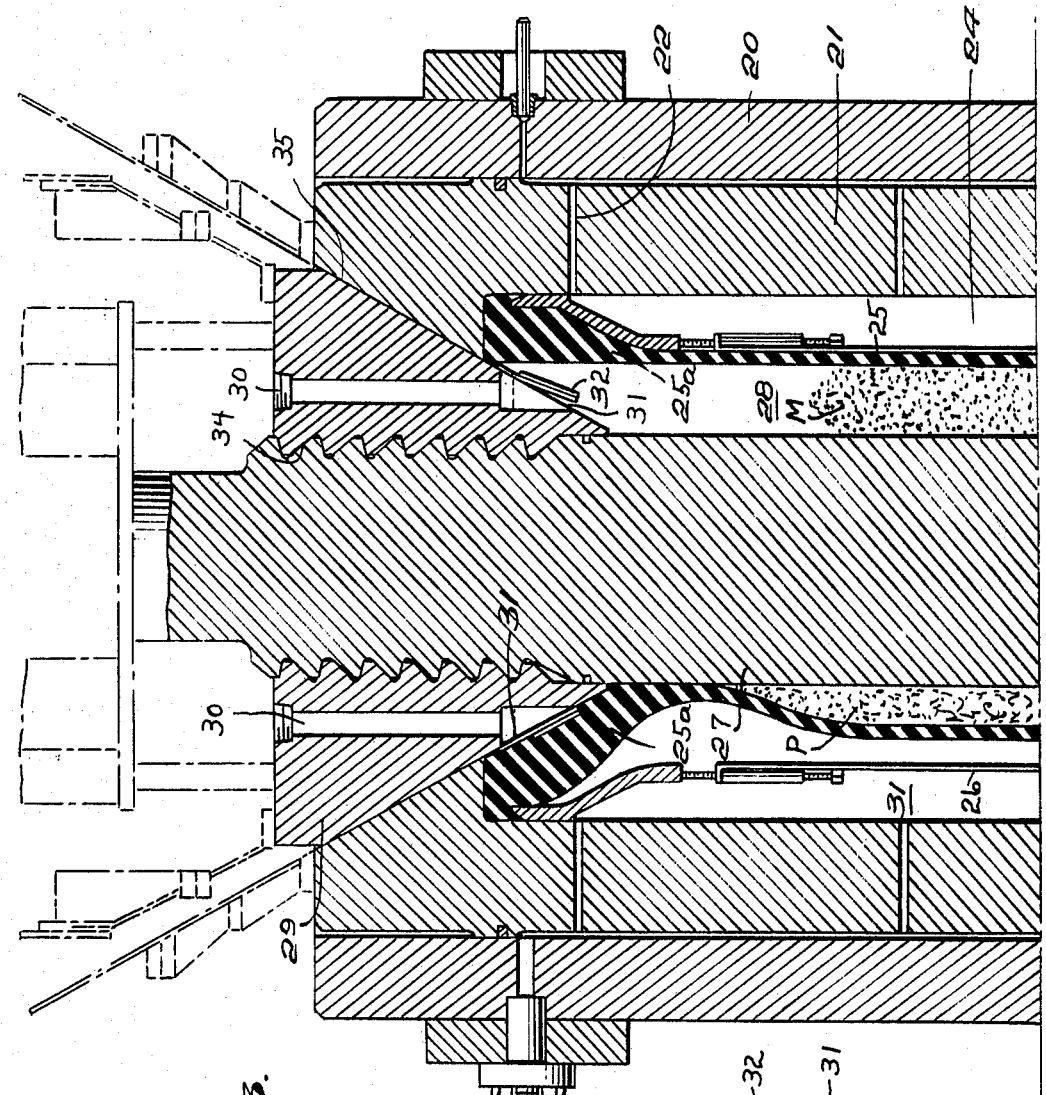

3,477,096
SELF-CLOSING VACUUM PORT FOR DRY BAG
ISOSTATIC MOULDING PRESS
Arnold G. Bowles, Warren, and James M. Manelick,
Youngsville, Pa., assignors to National Forge Company,
Irvine, Pa., a corporation of Delaware
Filed July 20, 1967, Ser. No. 654,743
Int. Cl. B29c 6/02
U.S. Cl. 18—5      4 Claims

ABSTRACT OF THE DISCLOSURE

An isostatic moulding press includes a mould chamber arranged to receive a charge of particulate material in granular or powdered form to be moulded after which the mould is then closed. Isostatic pressing of the charge is accomplished by means of an elastomeric tooling member one side of which lies in contact with the charge. A liquid is introduced into the press to engage the opposite side of the elastomeric member and pressure is applied to the liquid which is transmitted isostatically through the elastomeric member to the charge thus effecting the moulding. Prior to the pressurization phase, all air is exhausted from the mould chamber by means of a vacuum pump, and the port in the press through which the air is exhausted is arranged to be automatically cut off during the initial stage of pressurization by deformation of a part of the elastomeric member which serves to actuate a valve member controlling air flow through this exhaust port to its closed position.

---

This invention relates to an improvement in isostatic moulding presses and more particularly to presses of the so-called "dry bag" type wherein a charge of particulate material in granular or powdered form to be moulded is delivered to a mould chamber which includes an elastomeric tooling member, and pressure from a liquid at very high levels of the order of 30,000 lbs./sq. in. or more, is applied isostatically against one side of the tooling member to effect compaction and moulding of the material, which lies in contact with the opposite side of the tooling member, to the desired contour.

When isostatically pressing many particulate materials, it is necessary to evacuate the air from the mould chamber subsequent to charging it with the material and prior to application of pressure from the liquid. The primary object of the present invention is to provide an improved valve-controlled porting arrangement for removing this air wherein the porting area is of comparatively large cross-section so as to expedite removal of low density air and yet provide a simple and extremely reliable mode for closing off these ports in such manner that they can withstand the extremely high pressures which are involved. Closing off of the exhaust port is made self-actuating and is accomplished through deformation of a portion of the elastomeric tooling member itself at the initial stage of pressurization which serves to actuate a valve-closing member associated with the exhaust port at the inlet to the air discharge channel.

The foregoing as well as other objects and advantages inherent in the invention will become more apparent from the following detailed description of two different embodiments thereof and from the accompanying drawings wherein:

FIG. 1 is a central vertical section through one type of isostatic moulding press containing a bowl-shaped mould chamber lined with an elastomeric tooling member having a peripheral flange at the opening to the cavity and which when deformed under the initial pressure from the liquid, serves to actuate a sealing ring into a position closing off the air exhaust port;

FIG. 2 is an enlarged fragmentary sectional view in the vicinity of the sealing ring and the exhaust port showing the ring in its closing-off position of the port;

FIG. 3 is a central vertical section through a different type of isostatic moulding press for producing essentially cylindrical objects such as cylinders or tubes and the like wherein the elastomeric tooling member has a tubular configuration and is provided at one end thereof with a pressure deformable portion which serves to actuate valve plates in the form of a cantilever spring so as to close off the associated exhaust port; and FIG. 4 is an enlarged fragmentary section in the vicinity of one of the cantilever valve plates and the exhaust port showing the valve plate in its closing-off position of the port.

With reference now to the drawings and in particular to the first embodiment illustrated in FIGS. 1 and 2, the improved isostatic press structure includes an outer cylindrical steel housing 1 having a comparatively thick wall to withstand the very high pressure involved in the moulding operation. Housing 1 is closed at both ends by a stationary bottom closure member 2 and a movable top closure member 3, respectively, and the interior thereof serves as a chamber 1a to receive the liquid to be pressurized and the mould structure 4. The latter is made from high strength steel and includes a mould cavity 5 of the desired configuration which is lined with the elastomeric tooling member 6. The mould structure includes a system of channels 7 placing the chamber 1a in communication with various parts of the exterior surface of the elastomeric tooling member 6 so as to subject the latter to pressurization. The liquid to be pressurized enters chamber 1a through a channel 8 in the bottom closure member 2 and a pipe 9 located within the chamber.

The elastomeric tooling member 6 includes a top flange 10, and the upper surface of this flange is slightly separated from the undersurface of the top closure member 3 when the elastomeric tooling member is not subjected to pressure from the liquid. Set in flush with the upper surface of flange 10 and in line with the upper end of pipe 9 is a flat annular metallic ring 11 of such strength as to withstand the pressure of the liquid when pressed against the inlet port 12a of the air exhaust channel 12 in the top closure member 3 as depicted in FIG. 2. The upper outlet end of channel 12 is adapted to be connected to a vacuum pump, not shown, for withdrawing all air from the interior of the mould cavity prior to the pressurization phase.

When the vacuum pump is put into operation, air trapped within the mould chamber is exhausted from the mould chamber 5 through a narrow transverse gap 13 then existing between the upper surface of flange 10 is the tooling member and the under-surface of the upper closure member 3 of the press, and thence through the open port 12a into the exhaust channel 12. When all air has been exhausted, the liquid in chamber 1a is pressurized thus deforming the flange 10 from its normal rest position and moving it upward so as to carry the sealing ring 11 into contact with the port 12a and close off the exhaust channel 12.

In the particular embodiment illustrated, the upper closure member 3 can be raised from its fully closed position depicted in FIG. 1 and is retained in its lower, closed position by a breech nut 14. For filling the mould chamber 5 with particulate mould material, a feed tube 15 is united to the cover member 3 in alignment with a through bore 16 which terminates in a cone type of gate valve comprising a vertically movable coned valve member 17 and a tapered valve seat 17a secured to and movable with the upper closure member 3. A threaded mandrel 18 is secured to the bottom of valve member 17 and serves as a core for the bowl-shaped member B which is to be moulded in the particular mould which has been illustrated.

To charge the mould, the valve member 17 is lowered to the position indicated in FIG. 1 but the upper closure member is held upwardly, in spaced relation from the fully closed position depicted, so that a gap indicated by dash-dot lines exists between valve 17 and its seat 17a and through which the charge can be passed from feed tube 15 and bore 16 into the mould cavity 5. After the mould cavity has been filled, the upper closure member 3 is lowered to its fully closed position as depicted in FIG. 1, thus closing valve 17, 17a, and breech nut 14 is then inserted and rotated to lock the closure member 3 in this closed position.

After the pressure has been applied for the required time, the mould chamber is then de-pressurized, breech nut 14 is unlocked and the upper closure member 3 together with valve 17, 17a and the moulded member B, the outer surface configuration of which is indicated by the dash-dot line, and which is secured to the mandrel by virtue of the threaded connection 19, are removed from the chamber. By means not shown, the mandrel is then unscrewed from the moulded member B to complete a moulding cycle.

In the second embodiment of the invention, as illustrated in FIG. 3, the outer thick-walled cylindrical steel housing of the press is indicated at 20 and encloses an inner thick-walled steel tubular member 21 provided with a system of transverse channels 22 through which the liquid to be pressurized, and which enters through an inlet 23, is distributed to an annular space 24 defined by the inner surface of the tubular member 21 and the outer surface of the cylindrical tubular elastomeric tooling member 25, supported vertically within the press by means of a cage-like metallic structure 26. Spaced inwardly from the elastomeric tooling member 25 is a cylindrical mandrel 27 and the material to be moulded is charged into the annular chamber 28 therebetween thus to form a cylindrical tubular object such as a pipe P.

The top closure member for the press is indicated at 29 and is seen to include a pair of diametrally opposite longitudinally extending channels 30 through which air is exhausted from chamber 28 after charging but prior to pressurization, the upper, outlet ends of these channels being adapted to be connected with evacuating equipment, not illustrated. The lower end of each air exhaust channel terminates within chamber 28 in the form of an obliquely extending, multi-slotted port structure 31 which is adapted to be closed off by a valve plate 32.

Each valve plate 32 is constituted as a bent cantilever spring secured at 33 to the port structure 31 as depicted in FIG. 4. The spring loading is such as to position valve plate 32 at a distance from the slotted port 31 when the elastomeric tooling member 25 occupies a non-deformed state as indicated in the right hand half of FIG. 3 thus opening the port to permit air from the mould chamber 28 to be drawn outwardly through channels 30. However, when the liquid introduced into the annular space 24 intermediate the tubular member 21 and tooling member 25 is pressurized, the upper, thickened end 25a of the tooling member will be deformed inwardly and upwardly as depicted in the left hand half of FIG. 3 to engage and press the valve plates 32 to the position indicated in FIG. 4 thus closing the slotted ports 31 and sealing closed the mould chamber 28 so that isostatic moulding of the charge can proceed.

Mandrel 27 is connected to the top closure member 29 of the press by means of an interrupted type of thread 34 in the fashion of a breech lock connection so that the mandrel can be separated from the closure member by rotating the mandrel through an angle of the order of 45°. Mandrel 27 is rotatable but remains axially stationary. When released from the mandrel, closure member 29 can be raised to a position establishing a conical gap at the tapered interface 35 between it and member 21 and through which the press is charged with particulate moulding material M from a plurality of feed chutes, not illustrated, positioned around the conical opening and which move in to pouring position. After charging, the press is re-closed by lowering closure member 29 and locking it in position by rotation of mandrel 27.

After the pipe P has been moulded and the press de-pressurized, it is removed from the press by removing and lowering a bottom closure member, not shown, similar to the upper closure member in that it is also connected to the rotatable mandrel 27 by an interrupted type of thread to establish a breech lock. After unlocking from the mandrel, the bottom closure member which supports the moulded pipe is lowered until the upper end of the pipe is clear of the mandrel, which as previously explained remains fixed as to its axial position within the press. The pipe is then picked off the bottom closure member and the latter is then raised to its position closing off the bottom of the press. This completes one cycle of operation. The mandrel being in its unlocked position, the upper closure member can then be raised to thus open the top of the press to initiate another cycle of operation.

We claim:

1. An isostatic moulding press comprising a housing having an end closure member and providing therein a mould chamber for receiving a charge of particulate material to be moulded, said end closure member being provided with an exhaust channel terminating in an exhaust port at said chamber and trough which air is withdrawn subsequent to charging the chamber with the material, an elastomeric tooling member secured within said mould chamber, one side of said tooling member being in contact with the material to be moulded and the opposite side thereof being in contact with a liquid to be pressurized, said liquid when pressurized serving to effect a deformation of said elastomeric tooling member which compacts and moulds the material under isostatic pressure conditions, and movable valve means located at said exhaust port and actuated by said elastomeric tooling member upon initial deformation thereof for closing off said exhaust port and sealing said mould chamber.

2. An isostatic moulding press as defined in claim 1 wherein said elastomeric tooling member is provided with a pressure deformable flange portion reaching to said exhaust port and spaced slightly from the inner surface of said end closure member when non-deformed to provide an air passageway from said mould chamber into said exhaust channel, and wherein said movable valve means is constituted by a plate carried by said flange portion of said tooling member and which is movable into a position for closing off said exhaust port when said flange portion is deformed as a result of application of pressure to the liquid.

3. An isostatic moulding press as defined in claim 1 wherein said movable valve means is constituted by a valve plate carried by said end closure member and spring loaded to an open position, and wherein said elastomeric tooling member includes a pressure deformable portion movable into engagement with said valve plate upon application of pressure to the liquid and actuating the same to a position closing off said exhaust port.

4. An isostatic moulding press as defined in claim 3 whereby said valve plate is constituted by a bend cantilever spring secured to said end closure member.

References Cited

UNITED STATES PATENTS

| | | |
|---|---|---|
| 3,034,191 | 5/1962 | Schaefer et al. |
| 3,114,934 | 12/1963 | Gerletz. |
| 3,172,153 | 3/1965 | Loomis et al. |
| 3,263,008 | 7/1966 | Bender. |
| 2,101,015 | 12/1937 | Anderson. |
| 2,152,738 | 4/1939 | Jeffery. |
| 2,449,407 | 9/1948 | Mulholland. |
| 2,766,484 | 10/1956 | Sanderson. |
| 2,765,494 | 10/1956 | Weingart. |
| 3,258,384 | 6/1966 | Scott. |
| 2,803,043 | 8/1957 | Stephens. |

FOREIGN PATENTS 648,085  10/1962  Italy.

J. HOWARD FLINT, Jr., Primary Examiner

PO-1050
(5/69)

UNITED STATES PATENT OFFICE
CERTIFICATE OF CORRECTION

Patent No. __3,477,096__    Dated __November 11, 1969__

Inventor(s) __ARNOLD G. BOWLES and JAMES MANELICK__

It is certified that error appears in the above-identified patent and that said Letters Patent are hereby corrected as shown below:

Claim 1, line 6, the word "trough" should be
- - through - -
    Claim 4, line 2, the word "bend" should be
- - bent - -

SIGNED AND
SEALED
FEB 17 1970

(SEAL)
Attest:

Edward M. Fletcher, Jr.
Attesting Officer

WILLIAM E. SCHUYLER, JR.
Commissioner of Patents